US009955560B2

(12) United States Patent
Meitl et al.

(10) Patent No.: US 9,955,560 B2
(45) Date of Patent: Apr. 24, 2018

(54) CONFIGURING LIGHTING ELECTRONICS USING DATABASE AND MOBILE DEVICE

(71) Applicant: Robert Bosch GmbH, Stuttgart (DE)

(72) Inventors: Ryan Thomas Meitl, Northville, MI (US); Allen Marecki, Plymouth, MI (US)

(73) Assignee: ROBERT BOSCH GmbH, Stuttgart (DE)

( * ) Notice: Subject to any disclaimer, the term of this patent is extended or adjusted under 35 U.S.C. 154(b) by 0 days.

(21) Appl. No.: 15/127,763

(22) PCT Filed: Mar. 27, 2015

(86) PCT No.: PCT/US2015/023005
§ 371 (c)(1),
(2) Date: Sep. 20, 2016

(87) PCT Pub. No.: WO2015/148929
PCT Pub. Date: Oct. 1, 2015

(65) Prior Publication Data
US 2017/0181254 A1    Jun. 22, 2017

Related U.S. Application Data

(60) Provisional application No. 61/972,123, filed on Mar. 28, 2014.

(51) Int. Cl.
*H05B 37/02* (2006.01)
*G06F 17/30* (2006.01)
*G06K 7/14* (2006.01)

(52) U.S. Cl.
CPC ... *H05B 37/0272* (2013.01); *G06F 17/30345* (2013.01); *G06F 17/30424* (2013.01); *G06K 7/1404* (2013.01); *Y02B 20/48* (2013.01)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS

| 8,503,330 B1 | 8/2013 | Choong et al. |
| 8,536,984 B2 | 9/2013 | Benetz et al. |

(Continued)

FOREIGN PATENT DOCUMENTS

| WO | 2008068693 A1 | 6/2008 |
| WO | 2010067247 A1 | 6/2010 |
| WO | 20130132416 A1 | 3/2013 |

OTHER PUBLICATIONS

International Search Report and Written Opinion for Application No. PCT/US2015/023005 dated Jul. 6, 2015 (10 pages).

*Primary Examiner* — Minh D A
(74) *Attorney, Agent, or Firm* — Michael Best & Friedrich LLP

(57) ABSTRACT

Methods and systems are described for replacing a lighting device in a wireless lighting device network. A first lighting device is identified using a mobile device such as, for example, a smart phone. Configuration data for the first lighting device is downloaded to the mobile device from a configuration database. The first lighting device is physically replaced with a second, replacement lighting device and the second lighting device is identified using the mobile device. The downloaded configuration data corresponding to the first lighting device is then uploaded from the mobile device to the second lighting device and is subsequently used by the second lighting device to control the operation of the second lighting device. The configuration database is then updated based on the identification information for the
(Continued)

second lighting device and the configuration data uploaded to the second lighting device from the mobile device.

14 Claims, 6 Drawing Sheets

(58) Field of Classification Search
 CPC .............. H05B 37/029; H05B 33/0803; H05B 37/0254; H05B 37/02
 See application file for complete search history.

(56) References Cited

U.S. PATENT DOCUMENTS

| | | |
|---|---|---|
| 8,581,521 B2 | 11/2013 | Welten et al. |
| 2008/0211427 A1 | 9/2008 | Budde et al. |
| 2012/0212156 A1 | 8/2012 | Saes et al. |
| 2013/0229132 A1 | 9/2013 | Fong |
| 2013/0306621 A1 | 11/2013 | Chang et al. |
| 2014/0028200 A1* | 1/2014 | Van Wagoner .... H05B 37/0272 315/158 |
| 2014/0086590 A1* | 3/2014 | Ganick ................. G06Q 30/02 398/118 |

* cited by examiner

| Device | MAC Address | Device Type | Default Dim | Max. Current | Network Address | Group | Location Tag |
|---|---|---|---|---|---|---|---|
| 101 | 01:23:45:67:89:ab | 50W 1ch | 100% | 1000mA | | 1 | PLY-101 |
| 121 | 01:23:45:67:89:bc | 50W 1ch | 100% | 1000mA | | 2 | PLY-101 |
| 123 | 01:23:45:67:89:cd | 50W 1ch | 100% | 800mA | | 3 | PLY-101 |
| 125 | 01:23:45:67:89:de | 35W 1ch | 80% | 1000mA | | 4 | PLY-102 |
| 127 | 01:23:45:67:89:ef | 50W 4ch | 50% | 720mA | | 5 | PLY-102 |

*FIG. 3*

CONFIGURING LIGHTING ELECTRONICS USING DATABASE AND MOBILE DEVICE

RELATED APPLICATIONS

This application claims the benefit of U.S. Provisional Patent Application No. 61/972,123, filed Mar. 28, 2014, the entire contents of which are incorporated herein by reference.

BACKGROUND

Embodiments of the invention relate to methods and system of commissioning and configuring lighting devices.

SUMMARY

Many new construction and renovation projects today are installing smart lighting systems in order to be able to intelligently control the lighting schemes of the building. This is done for many reasons, but two of the biggest reasons are to improve energy utilization and to meet new "green" building standards. Despite advances in technology, there are still device failures in the field. Two of the biggest issues faced by luminaires are (1) the commissioning/configuration process and (2) difficultly replacing devices after failure.

When a device fails in the field in a soft addressed network like DALI (i.e., "digital addressable lighting interface"), the address is lost and there is no way to guarantee that the replacement device will have the correct network settings or configuration parameters (e.g., default dim level, maximum output current, fixture name, etc.). The effort involved to restore a fixture to its previous function after failure comes at a significant cost.

Embodiments of the invention provide methods and systems by which the configuration of lighting devices such as drivers and ballasts is simplified during initial commissioning, during retrofits, and during replacement of drivers due to failure. In one embodiment, the method utilizes wireless technology, a database, a mobile device, and labeling steps in manufacturing to deliver an improved and more seamless configuration experience to installers and building managers. Certain embodiments relate to methods of wirelessly commissioning lighting devices using MAC addresses and signal strength to configure the nearest light fixture.

In one embodiment, the invention provides a method of replacing a lighting device in a wireless lighting device network. A first lighting device is identified using a mobile device such as, for example, a smart phone. Configuration data for the first lighting device is downloaded to the mobile device from a configuration database. The first lighting device is physically replaced with a second, replacement lighting device and the second lighting device is identified using the mobile device. The downloaded configuration data corresponding to the first lighting device is then uploaded from the mobile device to the second lighting device and is subsequently used by the second lighting device to control the operation of the second lighting device. The configuration database is then updated based on the identification information for the second lighting device and the configuration data uploaded to the second lighting device from the mobile device.

Other aspects of the invention will become apparent by consideration of the detailed description and accompanying drawings.

BRIEF DESCRIPTION OF THE DRAWINGS

FIG. 3 is a representation of a lighting configuration database for the lighting network of FIG. 1B.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced. or of being carried out in various ways.

Figure 1A:
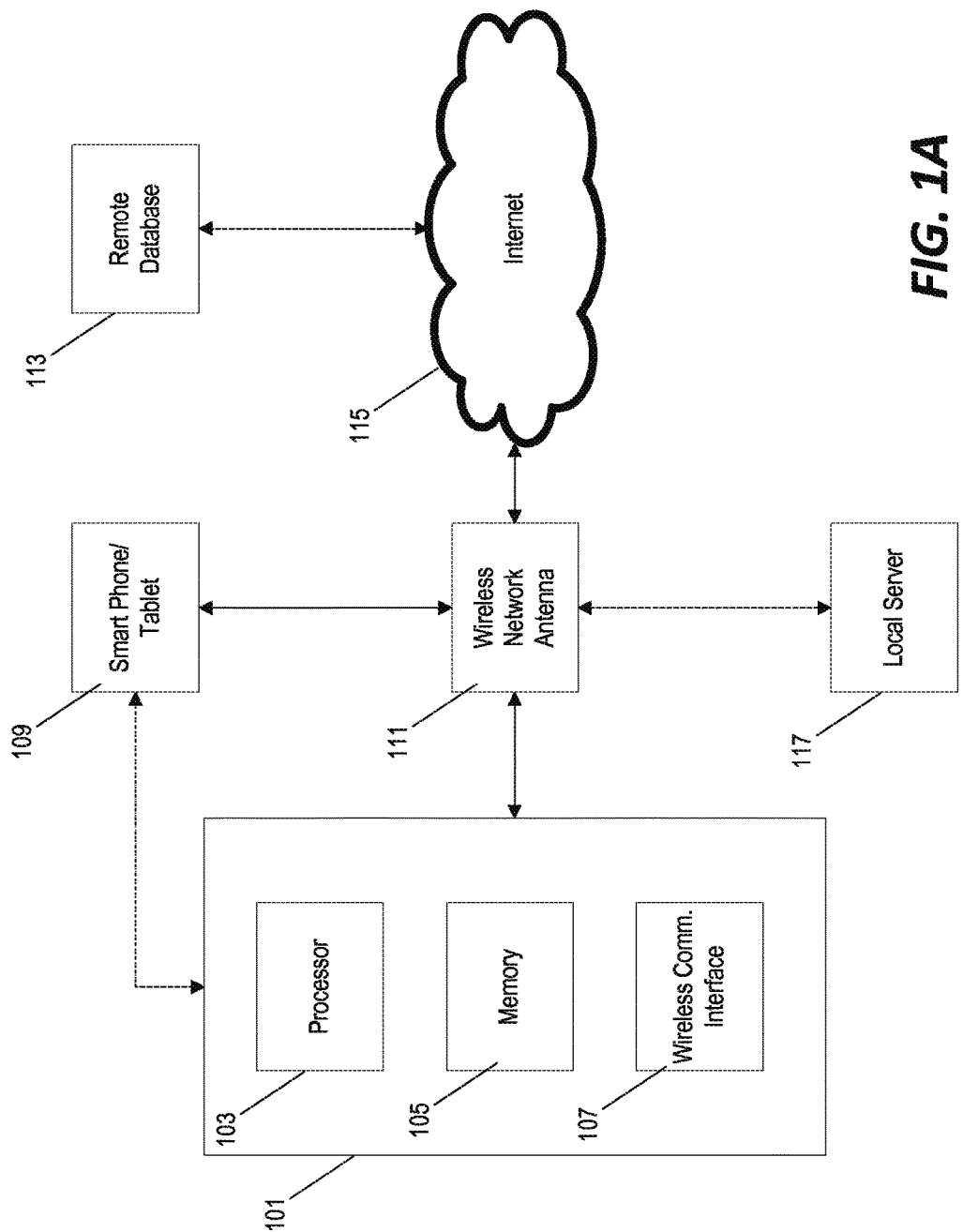
FIG. 1A is a block diagram of a wireless network including a lighting device and a mobile programming device according to one embodiment.

FIG. 1A illustrates an example of a wireless lighting device network. A lighting device 101 such as, for example, a wireless-enabled lighting driver or ballast, includes a processor 103 and a memory 105. The memory 105 stores various operating parameters and the processor 103 operates the lighting device 101 based on the stored operating parameters. The lighting device 101 also includes a wireless communication interface 107 for communicating with the wireless network and other devices. The wireless communication interface 107 may provide for one or more different wireless communication modalities including, for example, wifi, Bluetooth, or near-field communication (NEC).

A programmer/installer is able to define and adjust configuration parameters of the lighting device 101 and, in some implementations, control the operation of the lighting device 101 in real-time using a mobile device 109 such as a smart phone or a tablet. In the example of FIG. 1A, the mobile device 109 communicates with the lighting device 101 through a wireless network antenna 111 (e.g., a wifi network). However, as also illustrated in FIG. 1A, in some implementations, the mobile device 109 is able to communicate directly with the lighting device 101.

In the example of FIG. 1A, the mobile device 109 and/or the lighting device 101 are able to communicate with a remote database 113 through an Internet connection 115—the remote database 115 storing lighting configuration information for the installed lighting devices in the network. However, in some implementations, the lighting configuration database is stored locally on the mobile device 109. In some implementations, the wireless network antenna 111 also provides for communication with a local server 117 or a central on-site lighting control system.

Figure 1B:
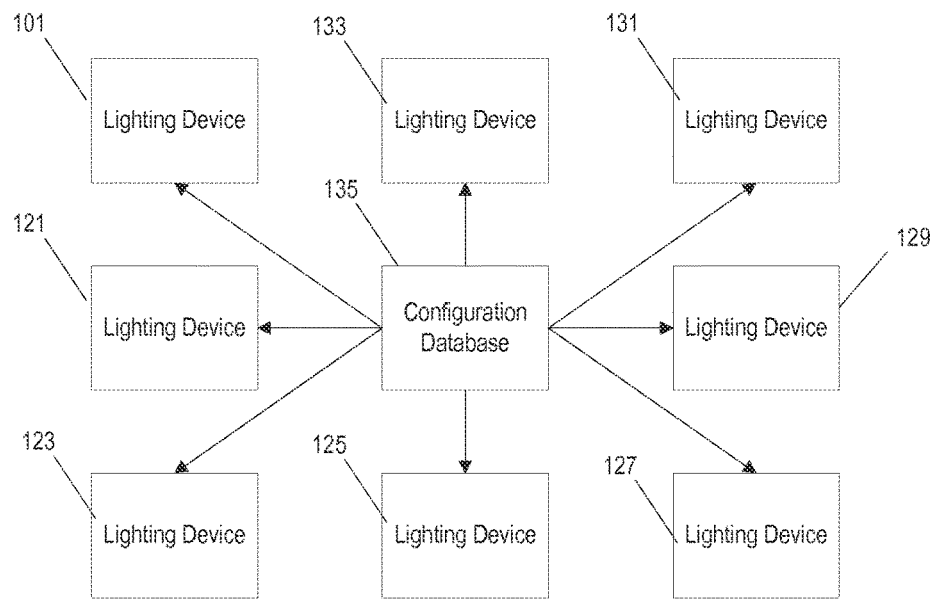
FIG. 1B is a block diagram of the wireless network of FIG. 1A including multiple lighting devices.

As described in further detail below, the programmer/installer uses the mobile device 109 to identify the specific lighting device 101 and then facilitates communication between the lighting configuration database and the lighting device 101 to the configuration profile for the lighting device 101. As illustrated in FIG. 1B, a wireless lighting network for a building may include several lighting devices 101, 121,

123, 125, 127, 129, 131, 133 each having a configuration profile stored locally on the memory of lighting device and centrally in the configuration database 135.

Figure 2:
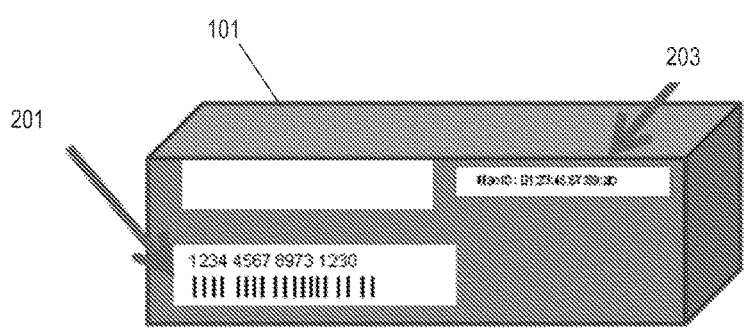
FIG. 2 is a perspective view of a lighting device with visually detectable identification markings on the exterior housing.

In some implementations, during production, the identifying information for a lighting device (e.g., a media access control ("MAC") address) is printed on a label 203 placed on the exterior of the device housing as shown in FIG. 2. Alternatively or additionally, the exterior of the device housing can include a label 201 with a bar code or QR code. When commissioning, decommissioning, or configuring a lighting device, the programmer/installer captures the data printed on the label 201 or 203 using a camera or other optical sensor on the mobile device 109.

An application running on the mobile device 109 can then causes configuration data to be uploaded to the identified lighting device by connecting to the lighting device without requiring the lighting device to go into any kind of discovery mode. The mobile device identifies the MAC address corresponding to the scanned label information, connects with the device on the wireless network corresponding to the MAC address, and establishes a wireless connection with the device.

Alternatively, in some implementations, a lighting device can be identified by relative signal strength. For example, a mobile device 109 held near a lighting device will detect wireless signals from several wireless devices in the vicinity. The application running on the mobile device detects an address or other identifiable information from the signal and sorts the signals by relative signal strength. The mobile device 109 is configured to determine that the device with the strongest relative signal strength corresponds to the device that is to be configured (or reconfigured) and a wireless connection is established with that device.

In some implementations, the relative signal strength mechanism for identifying a lighting device is used only for lighting devices that have a MAC address that is already included in the lighting configuration database. In such implementations, the mobile device 109 is configured to disregard wireless signals that cannot be associated with a MAC address that is already stored in the database and, therefore, sorts only the previously identified lighting devices by relative signal strength.

Furthermore, in some implementations, the lighting device 101 may use a visible light to indicate to the installer that a connection to the correct lighting device has been made as discussed in further detail below.

FIG. 3 illustrates an example of information that may be stored in the configuration database 135 for the lighting devices included in the network. The database 135 identifies each device by a device name or number and by a MAC address. The database 135 also defines the device type, default dim setting, and maximum current for each lighting device. Other information such as a network address, group number, and a location tag identifying a physical location of the lighting device is also stored in the database 135. Because a configuration profile for each connected lighting device in the network is stored in the configuration database 135, each configuration profile can be reassigned and uploaded to a replacement lighting device in the event of a device failure.

Figure 4:
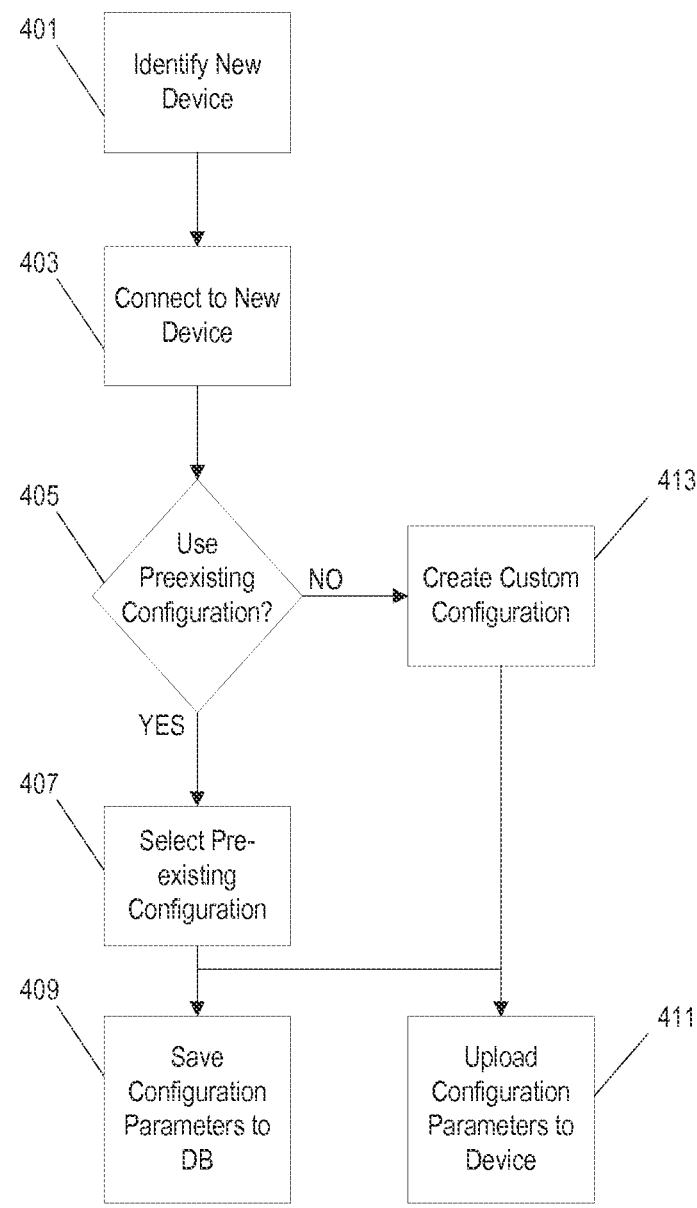
FIG. 4 is a flowchart of a method for adding a new lighting device to the network of FIGS. 1A and 1B.

FIG. 4 illustrates a method for adding a new lighting device to the network. This method may be used, for example, during initial set up of the building network or when a new device is added to an existing network. The mobile device 109 is used to identify the new device (step 401)—for example, by relatively wireless signal strength or by scanning label information on the new lighting device.

Once the lighting device is identified, the mobile device 109 establishes a connection with the lighting device based on the captured identification information (step 403). In some implementations, the new lighting device provides a visual indication (e.g., blinking the light) to confirm that the connection has been established. In various implementations, this visual indication can, for example, be manually confirmed by the user, detected by the camera of the mobile device, or detected by another onsite camera.

Using an application running on the mobile device 109, the installer/programmer indicates whether a pre-existing configuration profile is to be used or a custom profile is to be created for the new lighting device (step 405). If a pre-existing configuration profile is to be used, the application running on the mobile device 109 will display a list of available configuration profiles and the installer/programmer selects one for use with the new lighting device (step 407). The configuration database is updated to include an entry for the new device including information such as the MAC address and physical location of the lighting device as well as the details of the selected configuration profile (step 411). The configuration parameters of the selected configuration profile are then uploaded to the lighting device (step 409) and, as discussed above, the lighting device operates according to the stored configuration profile information.

If a customized configuration is to be used, the application running on the mobile device may allow the installer/programmer to define various customized settings for the lighting device directly through the mobile device (step 413). Alternatively, the mobile device can create a new entry in the configuration database including information such as the MAC address and physical location of the lighting device and the installer/programmer can later access the configuration database through a desktop computer to provide the customized configuration details, In either case, after the customized configuration profile information is created, it is saved in the configuration database (step 409) and uploaded to the lighting device (step 411).

Figure 5:
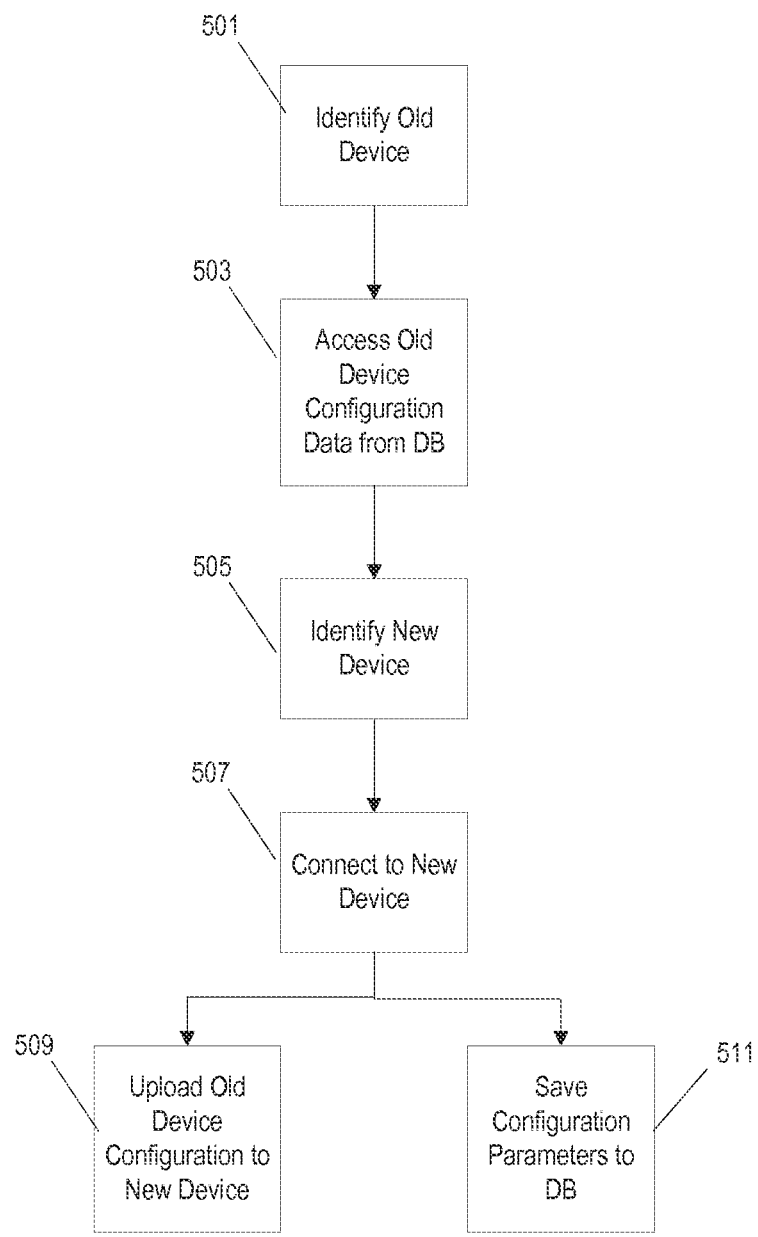
FIG. 5 is a flowchart of a method for replacing a lighting device in the network of FIGS. 1A and 1B.

In the examples illustrated above, the configuration parameters for each lighting device are stored locally on the lighting device to be utilized during operation. However, storing configuration profile information in the configuration database ensures that the configuration parameters are not lost in the event of a lighting device failure. Furthermore, by creating and storing a configuration profile for each lighting device in a configuration database, the configuration parameters can readily be reassigned to a new, replacement device when a current device fails or is retired. FIG. 5 illustrates a method for performing such a replacement. The mobile device 109 is used to identify the old, previously installed lighting device (step 501). If relatively signal strength is used to identify the lighting device, the old device must be identified before it is uninstalled and disconnected from its power source. If optical label information is used to identify the lighting device, the identification information can be captured before or after the old lighting device is uninstalled (depending on the accessibility and location of the label). Once the old lighting device is identified, the mobile device 109 accesses the device configuration profile for the old device from the configuration database (step 503).

The mobile device is then used to identify the new, replacement device (step 505). Again, if relative wireless signal strength is used to identify the device, the replacement device must be installed and connected to a power source before it can be identified by the mobile device. If scanned label information is used, then the replacement device can be installed either before or after it is installed (depending on accessibility and location of the label). The mobile device then establishes a connection with the new replacement device (step 507). In some implementations, the new lighting device provides a visual indication (e.g., blinking the light) to confirm that the connection has been established. In various implementations, this visual indication can, for example, be manually confirmed by the user, detected by the camera of the mobile device, or detected by another onsite camera.

The mobile device then uploads the configuration profile from the old device to the new replacement device (step 509). The mobile device also updates the configuration database updates the configuration profile entry for the old device to include the MAC address and other information for the new replacement device (step 511). Alternatively, the mobile device can update the configuration database to indicate that the old device is now inactive and creates a new entry in the configuration database for the new device (including the configuration parameters transferred from the old device).

Once a lighting device has been commissioned and added to the database, the operation of the lighting device can be modified by editing the configuration profile. The user can again use the mobile device to identify an installed lighting device (e.g., based on scanned label information or relative signal strength) and connect to the lighting device. Once the lighting device is identified, the mobile device accesses configuration profile information from the configuration database. The configuration information is edited, saved to the database, and wirelessly uploaded from the mobile device to the lighting device. In such implementations, the configuration database may be stored locally on the mobile device or stored remotely in a cloud-computing environment and accessed by the mobile device.

In other implementations, any Internet-enabled device (e.g., a desktop computer) can be configured to access the configuration database, update/edit configuration details, and cause the edited configuration profile to be uploaded to the lighting device through the Internet 115 and wireless antenna 111 as illustrated in FIG. 1A. However, in order to directly utilize remote, Internet-based reconfiguration, the lighting devices themselves would need to be IP-enabled so that they can receive information directly over the Internet. Alternatively, an intermediary device such as the mobile device or a local on-site lighting server could be used to access the configuration database and upload updated configuration profile information to the non-IP-enabled lighting device.

Figure 6:
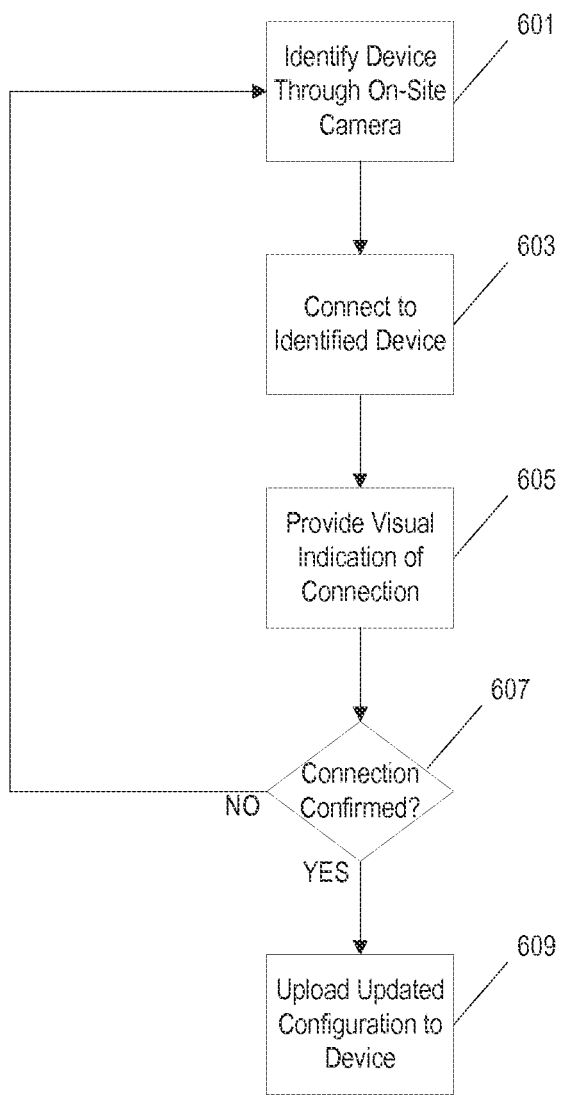
FIG. 6 is a flowchart of a method for remotely configuring a lighting device in the network of FIGS. 1A and 1B.

FIG. 6 illustrates a method for off-site remote configuration of installed lighting devices. A lighting device is selected, for example, by identifying the lighting device with a remotely-controllable, on-site camera (step 601). For previously commissioned devices, the MAC address for the lighting device can be identified based on physical location or other identifying characteristics. Alternatively, the on-site camera can be used to identify the lighting device by scanning label information. Power is applied to the identified device and a connection is established between the remote configuration device (e.g., a desktop computer) and the lighting device (step 603). The lighting device provides a visual indication of the established connection which is detected by the on-site camera (step 605). If the camera confirms that the appropriate lighting device has confirmed the connection (step 607), then edited configuration profile information can be entered through the remote system and uploaded to the lighting device (step 609). However, if the on-site camera cannot confirm an established connection or if the visual indication confirms that a connection has been established with the wrong lighting device (step 607), then the process is restarted and the system may again attempt to establish a connection with the correct lighting device.

Thus, the invention provides, among other things, systems and methods for wirelessly configuring lighting devices in a network and for replacing lighting devices by transferring an existing configuration profile from a configuration database to a new replacement device. Various features and advantages of the invention are set forth in the following claims.

What is claimed is:

1. A method for replacing a lighting device in a wireless lighting device network, the method comprising:
   identifying a first lighting device using a mobile device;
   downloading configuration data for the first lighting device to the mobile device from a configuration database;
   identifying a second lighting device using the mobile device;
   uploading the configuration data from the mobile device to the second lighting device; and
   updating the configuration database based on identification information for the second lighting device and the configuration data uploaded to the second lighting device from the mobile device.

2. The method of claim 1, further comprising:
   uninstalling the first lighting device from a first location; and
   installing the second lighting device at the first location, wherein the second lighting device replaces the first lighting device.

3. The method of claim 1, wherein identifying the first lighting device includes
   positioning the mobile device near the first lighting device,
   detecting, by the mobile device, a plurality of wireless signals, each wireless signal of the plurality of wireless signals generated by a different one of a plurality of devices,
   sorting the plurality of wireless signals by signal strength, and
   identifying the first lighting device as the device of the plurality of devices corresponding to the wireless signal of the plurality of wireless signals with a highest relative signal strength.

4. The method of claim 1, wherein identifying the first lighting device includes
   capturing, using a camera of the mobile device, an image of a printed identifier on an exterior housing of the first lighting device, and
   identifying a wireless address of the first lighting device based on the printed identifier.

5. The method of claim 1, wherein capturing an image of a printed identifier on the exterior housing of the first lighting device includes capturing at least one printed identifier from a group consisting of a QR code, a bar code, and a text identifier.

6. The method of claim 1, wherein downloading configuration data for the first lighting device to the mobile device from a configuration database includes downloading configuration data for the first lighting device to the mobile device through an Internet connection from a configuration database stored on a remote server.

7. The method of claim 1, wherein downloading configuration data for the first lighting device to the mobile device from a configuration database includes accessing configuration data for the first lighting device from a configuration database stored on the mobile device.

8. The method of claim 1, further comprising:
downloading configuration data for the second lighting device to the mobile device from the configuration database;
editing the configuration data for the second lighting device using the mobile device;
uploading the edited configuration data for the second lighting device from the mobile device to the second lighting device; and
updating the configuration database based on the edited configuration data for the second lighting device.

9. The method of claim 1, further comprising:
installing a third lighting device at a second location, the second location being different than the first location and inside a same building as the first location;
identifying the third lighting device using the mobile device;
uploading configuration data for the third lighting device from the mobile device to the third lighting device; and
updating the configuration database based on identification information for the third lighting device and the configuration data uploaded to the third lighting device from the mobile device.

10. The method of claim 9, further comprising selecting a configuration profile for the third lighting device from a list of configuration profiles, wherein uploading configuration data for the third lighting device includes uploading configuration data for the third lighting device based on the selected configuration profile.

11. The method of claim 10, wherein the act of selecting a configuration profile for the third lighting device includes receiving a selection of a configuration profile from a user through a user interface of the mobile device.

12. The method of claim 9, further comprising creating customized configuration profile for the third lighting device based on user input received through a user interface of the mobile device, and wherein uploading configuration data for the third lighting device includes uploading configuration data for the third lighting device based on the customized configuration profile.

13. The method of claim 1, further comprising:
establishing a wireless connection with the second lighting device based on the identification information; and
detecting, by the mobile device, a visual indication from the second lighting device confirming that the wireless connection is established before uploading the configuration data from the mobile device to the second lighting device.

14. The method of claim 1, wherein identifying the first lighting device using the mobile device includes identifying the first lighting device using a smart phone.

* * * * *